United States Patent [19]

German et al.

[11] Patent Number: 5,112,674

[45] Date of Patent: May 12, 1992

[54] CLING PACKAGING FILM FOR WRAPPING FOOD PRODUCTS

[75] Inventors: Paul M. German, Friendswood; Marsha M. Arvedson, Houston, both of Tex.

[73] Assignee: Exxon Chemical Company Inc., Linden, N.J.

[21] Appl. No.: 432,959

[22] Filed: Nov. 7, 1989

[51] Int. Cl.[5] .............................................. B32B 7/02
[52] U.S. Cl. ..................................... 428/216; 426/127; 426/129; 426/392; 428/517; 428/520; 428/521
[58] Field of Search ............... 428/516, 517, 520, 216, 428/521; 426/127, 129, 392

[56] References Cited

U.S. PATENT DOCUMENTS

| | | | |
|---|---|---|---|
| 4,087,505 | 5/1978 | Sugimoto et al. | 264/95 |
| 4,346,196 | 8/1982 | Hoh et al. | 428/56 |
| 4,379,197 | 4/1983 | Cipriani et al. | 428/220 |
| 4,524,099 | 6/1985 | Di Luccio | 428/213 |
| 4,533,578 | 8/1985 | Boyd et al. | |
| 4,579,696 | 4/1986 | Di Luccio | 264/22 |
| 4,601,930 | 7/1986 | Engelsberger | 428/349 |
| 4,657,811 | 4/1987 | Boyd et al. | 428/318.6 |
| 4,671,987 | 6/1987 | Knott et al. | 428/216 |
| 4,713,282 | 12/1987 | Yazaki et al. | 428/216 |
| 4,755,403 | 7/1988 | Ferguson | 428/35 |
| 4,765,857 | 8/1988 | Ferguson | 156/229 |
| 4,770,731 | 9/1988 | Ferguson | 156/229 |
| 4,774,277 | 9/1988 | Janac et al. | |
| 4,806,411 | 2/1989 | Mattingly et al. | 428/139 |

FOREIGN PATENT DOCUMENTS

| | | |
|---|---|---|
| 0011930 | 11/1979 | European Pat. Off. . |
| 0243510 | 4/1986 | European Pat. Off. . |
| 0206826 | 6/1986 | European Pat. Off. . |
| 0217252 | 9/1986 | European Pat. Off. . |
| 0229715 | 1/1987 | European Pat. Off. . |
| 0308106 | 9/1987 | European Pat. Off. . |
| 333508 | 3/1989 | European Pat. Off. . |

Primary Examiner—Edith L. Buffalow
Attorney, Agent, or Firm—M. B. Kurtzman

[57] ABSTRACT

The present invention is directed to a cling packaging film for use in wrapping food products, particularly fresh meat and produce. The film comprises a core layer containing a copolymer of ethylene and an ethylenically unsaturated polar comonomer together with an elastomeric polymer. The film further comprises a skin layer containing linear low density polyethylene. Both the core and skin layers may contain additional components. A film in accord with the present invention compares favorably with PVC food wrap film and is intended to provide a replacement therefor.

26 Claims, 1 Drawing Sheet

CLING PACKAGING FILM FOR WRAPPING FOOD PRODUCTS

BACKGROUND OF THE INVENTION

1. Field of the Invention

The present invention generally relates to a cling packaging film. More specifically, the present invention is directed to a transparent, cling packaging film for wrapping consumer products, especially fresh meat and produce. The film of the invention comprises at least two layers, a skin layer principally comprising linear low density polyethylene and a core layer principally comprising a copolymer of ethylene and an ethylenically unsaturated polar comonomer and also containing an elastomeric polymer. These films are often referred to as PVC food wrap replacement films.

2. Description of the Background

Many food products, particularly fresh meat and produce, are wrapped in transparent, thin film. This film must be both transparent to provide an aesthetically pleasing product for the consumer and sufficiently strong to provide the protection desired. For example, in meat packaging, a crystal clear, transparent film is desired to provide a visually attractive wrapping for fresh meat typically placed on a plastic or foam package and then wrapped with the film. The film must be sufficiently strong to withstand the wrapping process, whether automated or manual, wherein the film is rapidly stretched about the product and sealed by clinging to itself or by heat sealing. Further, the film when stretched about the food product must provide protection from puncture upon deformation by being poked with fingers or other packages, and the film must exhibit good recoverability so that the deformation quickly disappears.

Fresh foods, particularly meat products, are wrapped automatically on processing lines with cling wrap film. The procedure involves the intermittent, high speed removal of film from a supply roll, the pushing of a tray filled with food upward until it impacts against the film, the stretching of the film around the tray to the lower side thereof and the sealing of the film. The film may be sealed by clinging to itself or by heat sealing the edges of the film. The elasticity of the film must maintain the stretched film in a tight fit about the product. These films must be transparent, tear resistant, puncture resistant and exhibit good recovery from deformation.

Polyvinyl chloride (PVC) film has long been the film of choice in the food wrap industry. However, the food wrap industry has expressed a desire for an alternative, PVC-free replacement film. It has been difficult to formulate compositions based on olefinic polymers for making a cling wrap film. These compositions must both satisfy the characteristics described above and satisfy the many food law requirements.

Films made of low density polyethylene have been used in stretch packaging. These films are often rigid, have low elongation and low tear strength. Although ethylene vinyl acetate films are free from many of the previously mentioned problems, EVA films suffer from poor tear resistance. In order to overcome these problems, laminated films comprising two or more layers of different materials having differing characteristics have been developed. Many patents have been directed to stretch and cling films comprising multiple layers of these and other principal and minor components. However, none of those patents have solved the long felt but unfulfilled need for a satisfactory PVC replacement film. None of these films have exhibited the desirable combination of tear strength, recoverability, optical clarity, sealability and other attributes important to a PVC replacement film.

SUMMARY OF THE INVENTION

The present invention is directed to a transparent, cling packaging film having at least two layers, including a skin layer comprising linear low density polyethylene and a core layer comprising a copolymer of ethylene and an ethylenically unsaturated polar comonomer together with an elastomeric polymer. Preferably the polar comonomer is an ethylenically unsaturated ester or carboxylic acid. Most preferably the core layer comprises about 70–90 percent by weight ethylene vinyl acetate (EVA) containing at least 18 percent by weight vinyl acetate and about 5–30 percent by weight styrene isoprene styrene (SIS) block copolymer.

The packaging film of the present invention provides an ideal PVC replacement wrap for use in food processing. The film compares favorably with PVC food wrap. A film in accord with the present invention is simple to manufacture and is cost effective. It does not require the addition of a tackifying agent to provide cling. This film is easily treated and printed. It provides overall barrier properties at least equivalent to those of PVC film. It is free from extractable plasticizers often found in PVC film. Further, a film in accord with the present invention may also contain common additives, e.g., anti-fogging agents, anti-oxidants, colorants and tackifiers. Finally, these films may be produced using conventional cast and blown film forming processes and used with conventional PVC food wrapping equipment. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed description in connection with the accompanying drawings, wherein.

Figure 1:
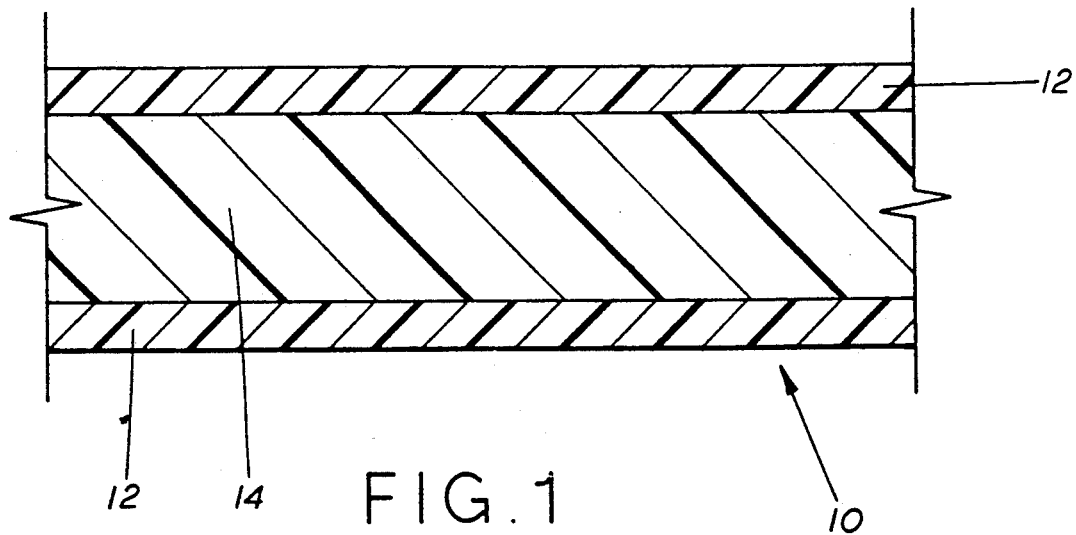
FIG. 1 is a cross-sectional representation of a three layer packaging film of an ABA configuration in accord with the present invention.
Figure 2:
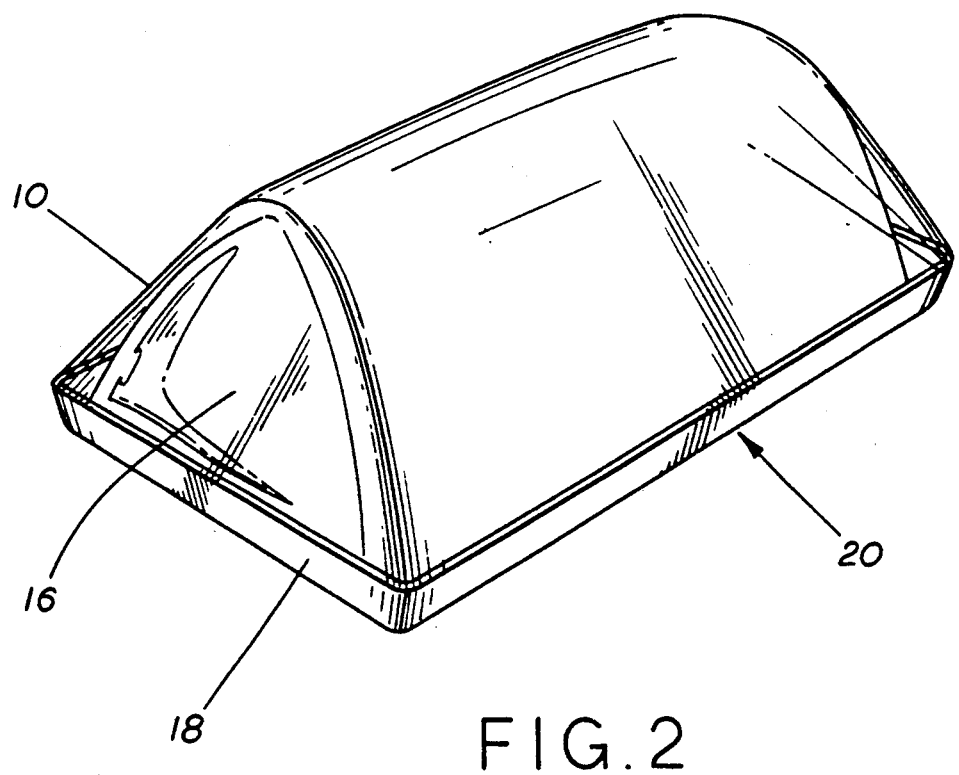
FIG. 2 is a perspective illustration of a packaged food article in accord with the present invention.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DETAILED DESCRIPTION OF THE PREFERRED EMBODIMENT

The present invention provides a transparent, cling packaging film 10 having at least two layers, i.e., a skin layer 12 and a core layer 14. The skin layer is characterized by a higher crystallinity than the core layer. The skin layer contributes substantially to the tear and tensile strength of the film. The skin layer is also responsible for the optical characteristics of haze and gloss. The core layer has a lower crystallinity and is more highly amorphous than the skin layer. The core layer provides the improved recoverability to deformation by poking. The core layer is also chiefly responsible for the oxygen transmission characteristics of the film. The right degree of oxygen transmission is required in meat packaging films to provide the correct bloom to the meat to provide the desired visual appearance of the product sought by consumers.

The skin layer comprises linear low density polyethylene (LLDPE). The linear low density polyethylene is preferably a polymer containing up to about 10 percent of a comonomer derived unit to give a density of from 0.915 to 0.925. The comonomer derived units may be obtained from a $C_4$ to $C_9$ alphaolefin, preferably a $C_8$ alphaolefin. The melt index is from about 0.4 to 10.0, preferably about 1.0 to 3.5. The density is from about 0.90 to 0.93, preferably from about 0.915 to 0.925.

In an alternative embodiment the skin layer may also include up to about 10 percent by weight of a polymer selected from the group consisting of ethylene vinyl acetate (EVA), low density polyethylene (LDPE), very low density polyethylene (VLDPE) and blends thereof. Further, the skin layer may include other conventional additives including anti-fogging agents, anti-oxidants, colorants and the like. Glycerine mono-oleate (GMO) in quantities up to about 2 percent by weight is often used as an anti-fogging agent.

In another embodiment, the skin layer comprises about 90-100 % by weight linear low density polyethylene, about 0-2% by weight glycerine mono-oleate and about 0-10% by weight of a polymer selected from the group consisting of ethylene vinyl acetate, low density polyethylene and blends thereof.

The core layer is principally comprised of a copolymer of ethylene and an ethylenically unsaturated polar comonomer. The polar comonomer is selected from the group consisting of ethylenically unsaturated esters, ethylenically unsaturated carboxylic acids and blends thereof. The preferred comonomers are vinyl acetate, methyl acrylate, methyl methacrylate, acrylic acid, methyl acrylic acid, methyl methacrylic acid and acrylic acid/methyl acrylate.

Preferably the ethylenically unsaturated ester is vinyl acetate and the copolymer contains about 5 to 50 percent by weight vinyl acetate, preferably at least 18 percent by weight vinyl acetate and most preferably about 20-30 percent by weight vinyl acetate. The melt index of the ethylene copolymer is from 0.3 to 12.0, preferably from 1.0 to 7.0 and most preferably from 2.0 to 6.0. The core layer contains about 70-90 percent by weight of the above described copolymer.

The preferred elastomeric polymer is a block copolymer, preferably selected from the group consisting of styrene/isoprene styrene (SIS) block copolymers, styrene/butadiene/styrene (SBS) block copolymers and styrene/ethylene butylene/styrene (SEBS) block copolymers. The most preferred elastomeric polymer is a styrene/isoprene/styrene block copolymer. The elastomeric polymer should be used in amounts which do not give rise to compatibility problems with the ethylene copolymer. Compatibility and imparting of the desired characteristics are achieved when the elastomeric polymer is present from about 5-30 percent by weight in the core layer.

In an alternative embodiment the core layer may also include up to about 10 percent by weight of a polymer selected from the group consisting of linear low density polyethylene (LLDPE), low density polyethylene (LDPE), very low density polyethylene (VLDPE) and blends thereof.

In another embodiment, at least one of the layers of the packaging film comprises less than about 10% low density polyethylene.

Conventional additives may be included in either the core or skin layers. For example, anti-fogging and anti-blocking agents may be added. Although low molecular weight additives may produce added plasticity, excessive amounts of anti-blocking agents may give an oil-like feel to the film and thus should be avoided.

The film of the present invention typically has a thickness within the range of 0.2 to 1.4 mil, preferably 0.4 to 0.7 mil and most preferably 0.5 to 0.6 mil. The film is preferably formed having two skin layers of identical composition, one on each side of the core layer. In such a construction the core layer comprises about 70 to 80 percent by weight of the film while each of the skin layers comprises about 10 to 15 percent by weight of the film.

The components for the skin and core layers may be individually blended by kneading the respective resin components in conventional mixers. Production of films from these components may be accomplished by conventional methods, including blown tubular film extrusion and chill roll cast film extrusion. The film may be used with conventional food packaging, preferably meat packaging equipment. In use the film 10 is removed from a roll, contacted with the product 16, optionally disposed on tray 18, to be wrapped, stretched about the product and sealed by clinging to itself or by heat sealing to produce the packaged product 20 for display to the consumer.

EXAMPLE 1

A film having an ABA structure was produced in accord with the present invention. The skin layers were comprised of hexene linear low density polyethylene having a melt index of 3.2 and a density of 0.9175. The skin layers also contained about 2 percent glycerine mono-oleate as an anti-fogging agent. Each skin layer comprised about 15 percent by weight of the total film. The core layer was comprised of about 85 percent by weight ethylene vinyl acetate having a melt index of 3.0 and containing about 28 percent vinyl acetate. Also present in the core layer was about 15 percent styrene/isoprene/styrene block copolymer. The core layer comprised about 70 percent by weight of the total film. Films were produced utilizing a conventional slot, cast extrusion process.

EXAMPLE 2

A second film in accord with the present invention was produced. The skin layers were comprised of hexene linear low density polyethylene having a melt index of 3.2 and a density of 0.9175. The skin layers also contained about 2 percent glycerine mono-oleate as an anti-fogging agent. Each skin layer comprised about 10 percent by weight of the total film. The core layer was comprised of about 70 percent by ethylene vinyl acetate having a melt index of 3.0 and containing about 28 percent vinyl acetate. Also present in the core layer was about 30 percent styrene/isoprene/styrene block copolymer. The core layer comprised about 80 percent by weight of the total film.

COMPARATIVE EXAMPLE 3

A comparative film not including the elastomeric polymer in the core layer was produced. This comparative film was identical to the film of Example 2 with the exception that no elastomeric polymer was included. Accordingly, the core layer was comprised entirely of the specified ethylene vinyl acetate.

The films produced in accord with the above examples were tested together with a conventional PVC food wrap film. Table 1 summarizes the results of many tests of the physical characteristics of a conventional PVC food wrap film, an ABA film in accord with the present invention and a similar ABA film without the elastomer in the core layer.

TABLE 1

| | | COMPARISON WITH PVC | | |
| --- | --- | --- | --- | --- |
| Film Property | | PVC | Example 2 ABA Film With Elastomer | Example 3 ABA Film Without |
| Thickness (mil) | | 0.6 | 0.71 | .53 |
| Haze (%) | | 2.9 | 1.3 | 0.3 |
| Gloss (at 45°) | | 86 | 95 | 98 |
| Shrinkage (%) | MD | 37 | 88 | 87 |
| | TD | 14 | −32 | −50 |
| Elongation | MD | 230 | 400 | 300 |
| at Break (%) | TD | 320 | 950 | 1020 |
| Tensile Strength at 200% (psi) | MD | 3850 | 2790 | 4540 |
| Tensile Strength | MD | 4440 | 4240 | 7010 |
| at Break (psi) | TD | 4110 | 2890 | 4200 |
| Recovery after | MD | 2.0 | 7.3 | 8.9 |
| 50% Elongation (% Set)[1] | TD | 5.9 | 8.6 | 10.3 |
| Recovery after | MD | 14.7 | 29.5 | 37.7 |
| 100% Elongation (% Set)[1] | TD | 17.5 | 30.1 | 36.3 |
| 1% Secant Modulus | MD | 8.2 | 8.0 | 20.2 |
| (kpsi) | TD | 5.6 | 6.4 | 10.7 |
| Elmendorf Tear | MD | 45 | 90 | 65 |
| (gm/mil) | TD | 90 | 345 | 405 |
| Dart Impact (gm/mil) | TD | 680 | 290 | 250 |

[1]Test defined by ASTM D 882 as modified herein.

Of a particular concern in the meat packaging industry is the recoverability of the film after being poked and deformed by fingers and other objects. In order to examine the elastic recoverability characteristics of the films produced in the above examples together with a PVC food wrap film, those films were subjected to a test to determine percent set. The test was defined by ASTM D 882 modified to provide a single cycle comprising a one minute hold at the specified percent elongation, followed by a one minute relaxation period after return to the initial unstretched position, and immediately followed by determination of percent change in length (reported as percent set). The results of these comparative test are reported in Table 2.

The inventive film has an elastic recoverability of less than 35% set after 100% elongation for one minute followed by relaxation to its initial unstretched position for one minute.

TABLE 2

| | | RECOVERY COMPARISON | | | |
| --- | --- | --- | --- | --- | --- |
| | | PVC | Example 1 ABA Film With Elastomer | Example 2 ABA Film With Elastomer | Example 3 ABA Film Without Elastomer |
| Recovery at 50% Stretch[1] | | | | | |
| Deformation | MD | 2.0 | 6.0 | 7.3 | 8.9 |
| (% Set) | TD | 5.9 | 7.9 | 8.6 | 10.3 |
| Load at | MD | 1020 | 890 | 1630 | 1450 |
| 1 Minute (psi) | TD | 530 | 310 | 310 | 360 |
| Recovery at 100% Stretch[1] | | | | | |
| Deformation | MD | 14.7 | 24.0 | 29.5 | 37.7 |
| (% Set) | TD | 17.5 | 23.2 | 30.1 | 36.3 |
| Load at | MD | 1210 | 900 | 1780 | 1600 |
| 1 Minute (psi) | TD | 690 | 320 | 310 | 340 |

[1]Recovery determined per ASTM D 882 modified with 1 minute hold and 1 minute relax for one cycle only The foregoing description of the invention has been directed in primary part to a particular embodiment in accordance with the requirements of the patent statutes and for purposes of explanation and illustration. It will be apparent, however, to those skilled in the art that many modifications and changes in the specifically described cling packaging film may be made without departing from the scope and spirit of the invention. Therefore, the invention is not restricted to the preferred embodiment illustrated but covers all modifications which may fall within the scope of the following claims.

What is claimed is:

1. A transparent, cling packaging film having at least two layers, comprising:
   a skin layer comprising linear low density polyethylene in an amount of from about 90 to about 100 percent by weight; and a core layer comprising a copolymer of ethylene and an ethylenically unsaturated polar comonomer, and an elastomeric polymer.

2. The packaging film of claim 1 wherein said polar comonomer is selected from the group consisting of ethylenically unsaturated esters, ethylenically unsaturated carboxylic acids, and blends thereof.

3. The packaging film of claim 2 wherein said polar comonomer is selected from the group consisting of vinyl acetate, methyl acrylate, methyl methacrylate, acrylic acid, methyl acrylic acid, methyl methacrylic acid and acrylic acid/methyl acrylate.

4. The packaging film of claim 1 wherein said copolymer is ethylene vinyl acetate containing about 5-50 percent by weight vinyl acetate.

5. The packaging film of claim 1 wherein said elastomeric copolymer is a block copolymer.

6. The packaging film of claim 5 wherein said block copolymer is selected from the group consisting of styrene/isoprene/styrene block copolymers, styrene/butadiene/styrene block copolymers and styrene/ethylene butylene/styrene block copolymers.

7. The packaging film of claim 1 wherein said core layer further comprises a polymer selected from the group consisting of linear low density polyethylene, low density polyethylene, very low density polyethylene and blends thereof.

8. The packaging film of claim 1 wherein said skin layer further comprises up to about 10 percent ethylene vinyl acetate copolymer.

9. The packaging film of claim 1 wherein said skin layer further comprises a polymer selected from the group consisting of low density polyethylene, very low density polyethylene, ethylene vinyl acetate and blends thereof.

10. The packaging film of claim 1 wherein the core layer further comprises less than about 10 percent low density polyethylene.

11. The packaging film of claim 1 further comprising an effective amount of an anti-fogging additive in at least one of said layers.

12. The packaging film of claim 11 wherein said additive is a glycerine mono-oleate added to said skin layer.

13. The packaging film of claim 1 further comprising a second skin layer, said skin layers on opposite sides of said core layer and identical in composition.

14. The packaging film of claim 12 wherein said film is from about 0.2-1.4 mil in thickness and wherein said core layer comprises about 70-80 percent by weight of said film and said skin layers each comprises about 10-15 percent by weight of said film.

15. The packaging film of claim 1 wherein said film has an elastic recoverability of less than 35% set after 100% elongation for one minute followed by relaxation to its initial unstretched position for one minute.

16. A transparent, cling packaging film, comprising:
   a core layer comprising about 70-90 percent by weight ethylene vinyl acetate containing at least about 18 percent vinyl acetate, about 5-30 percent by weight styrene/isoprene/styrene block copolymers and about 0-10 percent by weight of a polymer selected from the group consisting of linear low density polyethylene, low density polyethylene and blends thereof; and
   a skin layer on each side of said core layer, said skin layer comprising about 90-100 percent by weight linear low density polyethylene, about 0-2 percent by weight glycerine mono-oleate and about 0-10 percent by weight of a polymer selected from the group consisting of ethylene vinyl acetate, low density polyethylene and blends thereof,
   wherein said film is about 0.5-0.6 mil in thickness and wherein said core layer comprises about 70-80 percent by weight of said film and said skin layers each comprises about 10-15 percent by weight of said film.

17. A packaged article comprising a consumer product enclosed in a stretched, transparent cling packaging film having at least two layers, comprising:
   a skin layer comprising linear low density polyethylene in an amount of from about 90 to about 100 percent by weight; and a core layer comprising a copolymer of ethylene and an ethylenically unsaturated polar comonomer, and an elastomeric polymer.

18. The packaged article of claim 17 wherein said consumer product is a fresh, meat product and said packaging film comprises:
   a core layer comprising about 70-90 percent by weight ethylene vinyl acetate containing at least about 18 percent vinyl acetate, about 5-30 percent by weight styrene/isoprene/styrene block copolymers and about 0-10 percent by weight of a polymer selected from the group consisting of linear low density polyethylene, low density polyethylene and blends thereof; and
   a skin layer on each side of said core layer, said skin layer comprising about 90-100 percent by weight linear low density polyethylene, about 0-2 percent by weight glycerine mono-oleate and about 0-10 percent by weight of a polymer selected from the group consisting of ethylene vinyl acetate, low density polyethylene and blends thereof,
   wherein said film is about 0.4-0.7 mil in thickness and wherein said core layer comprises about 70-80 percent by weight of said film and said skin layers each comprises about 10-15 percent by weight of said film.

19. A process of wrapping a food product comprising stretching a transparent PVC-replacement film over said food product and sealing said food product within said film by clinging said film to itself, said film comprising:
   a skin layer comprising linear low density polyethylene in an amount of from about 90 to about 100 percent by weight; and a core layer comprising a copolymer of ethylene and an ethylenically unsaturated polar comonomer, and an elastomeric polymer.

20. The process of claim 19 wherein said food product is a fresh, meat product and said packing film comprises:
   a core layer comprising about 70-90 percent by weight ethylene vinyl acetate containing at least about 18 percent vinyl acetate, about 5-30 percent by weight styrene/isoprene/styrene block copolymers and about 0-10 percent by weight of a polymer selected from the group consisting of linear low density polyethylene, low density polyethylene and blends thereof; and a skin layer on each side of said core layer, said skin layer comprising about 90-100 percent by weight linear low density polyethylene, about 0-2 percent by weight glycerine mono-oleate and about 0-10 percent by weight of a polymer selected from the group consisting of ethylene vinyl acetate, low density polyethylene and blends thereof, wherein said film is about 0.4-0.7 mil in thickness and wherein said core layer comprises about 70-80 percent by weight of said film and said skin layers each comprises about 10-15 percent by weight of said film.

21. The packaging film according to claim 4 wherein the ethylene vinyl acetate contains at least 18 percent vinyl acetate by weight.

22. The film according to claim 21 wherein the core layer comprises about 70-90 percent by weight ethylene vinyl acetate.

23. The film according to claim 22 wherein the elastomeric polymer comprises about 5-30 percent by weight of the core layer.

24. The film according to claim 23 wherein the elastomeric polymer is a block copolymer selected from the group consisting of styrene/isoprene/styrene block copolymers, styrene/butadiene/styrene block copolymers and styrene/ethylene butylene/styrene block copolymers.

25. The film according to claim 24 wherein the skin layer comprises a polymer selected from the group consisting of ethylene vinyl acetate, low density polyethylene and blends thereof, in an amount up to about 10 percent by weight of the skin layer.

26. The film according to claim 25 wherein the core layer comprises about 85 weight percent ethylene vinyl acetate.

* * * * *